US006886806B2

(12) United States Patent
Borasch et al.

(10) Patent No.: US 6,886,806 B2
(45) Date of Patent: May 3, 2005

(54) THROTTLE-VALVE ACTUATING UNIT

(75) Inventors: Klaus Borasch, Schwabach (DE); Hans-Joerg Fees, Bietigheim-Bissingen (DE); Klaus Kaiser, Markgroeningen (DE); Uwe Hammer, Hemmingen (DE); Stephan Wuensch, Nuremberg (DE)

(73) Assignee: Robert Bosch GmbH, Stuttgart (DE)

( * ) Notice: Subject to any disclaimer, the term of this patent is extended or adjusted under 35 U.S.C. 154(b) by 38 days.

(21) Appl. No.: 10/148,549

(22) PCT Filed: Sep. 26, 2001

(86) PCT No.: PCT/DE01/03696

§ 371 (c)(1), (2), (4) Date: Oct. 24, 2002

(87) PCT Pub. No.: WO02/29226

PCT Pub. Date: Apr. 11, 2002

(65) Prior Publication Data

US 2003/0089870 A1 May 15, 2003

(30) Foreign Application Priority Data

Oct. 4, 2000 (DE) ........................................ 100 48 937

(51) Int. Cl.[7] ............................ F16K 1/22; F02D 9/10; F02D 11/10

(52) U.S. Cl. ....................................... 251/305; 251/307

(58) Field of Search ................................. 251/305–307

(56) References Cited

U.S. PATENT DOCUMENTS

| | | | | |
|---|---|---|---|---|
| 5,232,197 A | * | 8/1993 | Kalippke et al. | ...... 251/129.11 |
| 5,315,870 A | * | 5/1994 | Schwegel et al. | .......... 73/202.5 |
| 5,718,202 A | | 2/1998 | Bentz et al. | |
| 5,752,484 A | | 5/1998 | Wilczek | |
| 5,881,695 A | * | 3/1999 | Apel | .......................... 123/337 |
| 6,095,488 A | * | 8/2000 | Semeyn et al. | ........ 251/129.12 |
| 6,364,287 B1 | * | 4/2002 | Rauch et al. | ............... 251/305 |
| 6,672,280 B2 | * | 1/2004 | Price et al. | ................. 123/337 |

FOREIGN PATENT DOCUMENTS

| | | |
|---|---|---|
| DE | 195 25 510 A | 1/1997 |
| DE | 199 03 490 A | 8/2000 |
| EP | 1 024 268 A | 8/2000 |
| WO | WO 95 14911 A | 6/1995 |

* cited by examiner

*Primary Examiner*—Paul J. Hirsch
(74) *Attorney, Agent, or Firm*—Ronald E. Greigg

(57) ABSTRACT

In a throttle valve actuator unit having a throttle valve neck that contains a pivotable throttle valve and having a drive chamber for receiving an electric drive mechanism for the throttle valve and for receiving an electric connection plug for a plug connection to a control unit, in order to reduce the production costs while maintaining the many customer-specific characteristics, the drive chamber is enclosed by a housing module, and the throttle valve neck is attached as a separate part to the housing module and secured thereto.

17 Claims, 2 Drawing Sheets

THROTTLE-VALVE ACTUATING UNIT

CROSS-REFERENCE TO RELATED APPLICATIONS

This application is a 35 USC 371 application of PCT/DE 01/03696 filed on Sep. 26, 2001.

BACKGROUND OF THE INVENTION

1. Field of the Invention

The invention is directed to an improved throttle valve actuator unit for an internal combustion engine.

2. Description of the Prior Art

In a known throttle valve actuator unit (German Patent Disclosure DE 195 25 510 A1), also known as an electronic throttle control or ETC, a drive chamber is formed in the throttle valve neck, through which neck a gas conduit carrying air or a fuel-air mixture extends; the drive chamber is closed with a plastic cap and contains a drive motor, a reducing gear connecting the motor to the throttle valve shaft, and a connection plug for connecting the throttle valve actuator unit to an electric control unit. The connection plug is embodied on the plasticcap. The throttle valve actuator unit has customer-specific characteristics with regard to the diameter of the throttle valve neck, the dimensions of the securing flange on the throttle valve neck, and the embodiment of the connection plug, and so special production tools must be kept on hand for every customer; some of these tools are quite expensive, and therefore considerably increase the production costs for the throttle valve actuator unit.

A transition has therefore already been made to a modular system, with which graduated diameter variants for the throttle valve neck and the flange dimensions can be offered to customers with one small and one large model series, each of which is offered with two different connection plugs; this accordingly meets the majority of customer-specific characteristics. However, for each type of one model series, its own tool is required. Each plug variant must also be provided with its own tool for the plastic cap, in both the large and the small model series.

SUMMARY OF THE INVENTION

The throttle valve actuator unit of the invention has the advantage that because of its modular design, only a single housing module is needed for each model series of the modular system, and then the relatively simple throttle valve neck with a diameter and flange embodiment adapted to customer specifications can be attached to the housing module by the manufacturer. As a result, the throttle valve neck itself can be designed such that a plurality of stub diameters can be accommodated using only a single tool.

In a preferred embodiment of the invention, the connection plug is likewise attached as a separate part to the housing module and secured to it. As a result, the connection plug can be prefabricated at the factory in various versions that meet customer specifications and mounted on the housing module in the same position. The plug pins themselves can be connected to the other required contact points by way of a printed circuit board, which is prepared to receive various plug variants.

In an advantageous embodiment of the invention, a connecting scoop with an individually adapted hose connection geometry is inserted as a separate pipe segment into the throttle valve neck. The pipe segment made as a separate part of plastic or metal can easily be designed in terms of its hose connection geometry to meet customer demands and then inserted into the throttle valve neck, for instance being press-fitted or glued into place.

In a preferred embodiment of the invention, the throttle valve neck is produced as an extruded profile. This has the advantage of substantially lower production costs, compared to the die-casting process employed until now, as well as of substantially lower tool costs. In particular, the extruded profile embodiment also offers the possibility of accommodating multiple throttle valve diameters with a single tool. The extruded profile is manufactured as an endless profile with the appropriate inside diameter and flange dimensions of the throttle valve neck and is then cut to the required length of throttle valve neck. The blank cut to the appropriate length is then machined into the desired final form by removal of material.

BRIEF DESCRIPTION OF THE DRAWINGS

The invention is described in further detail below, with reference to the drawings, in which.

DESCRIPTION OF THE PREFERRED EMBODIMENT

Figure 1:
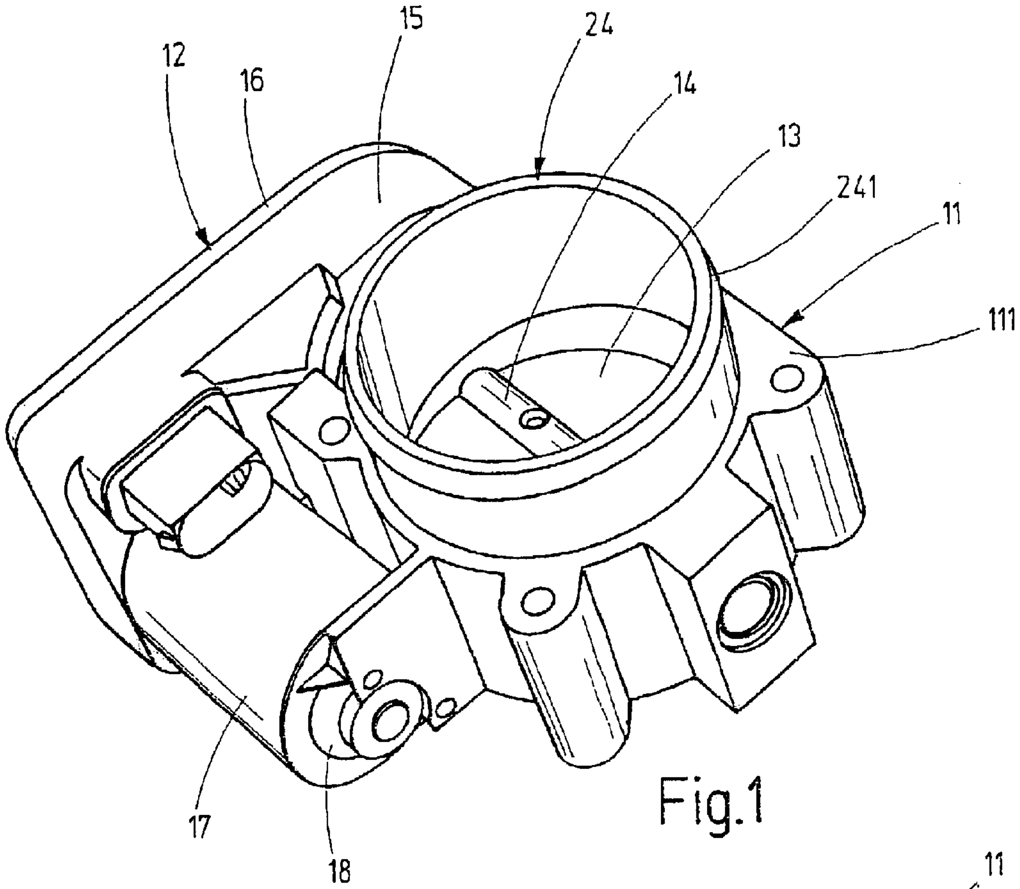
FIG. 1, a perspective view of a throttle valve actuator unit.
Figure 2:
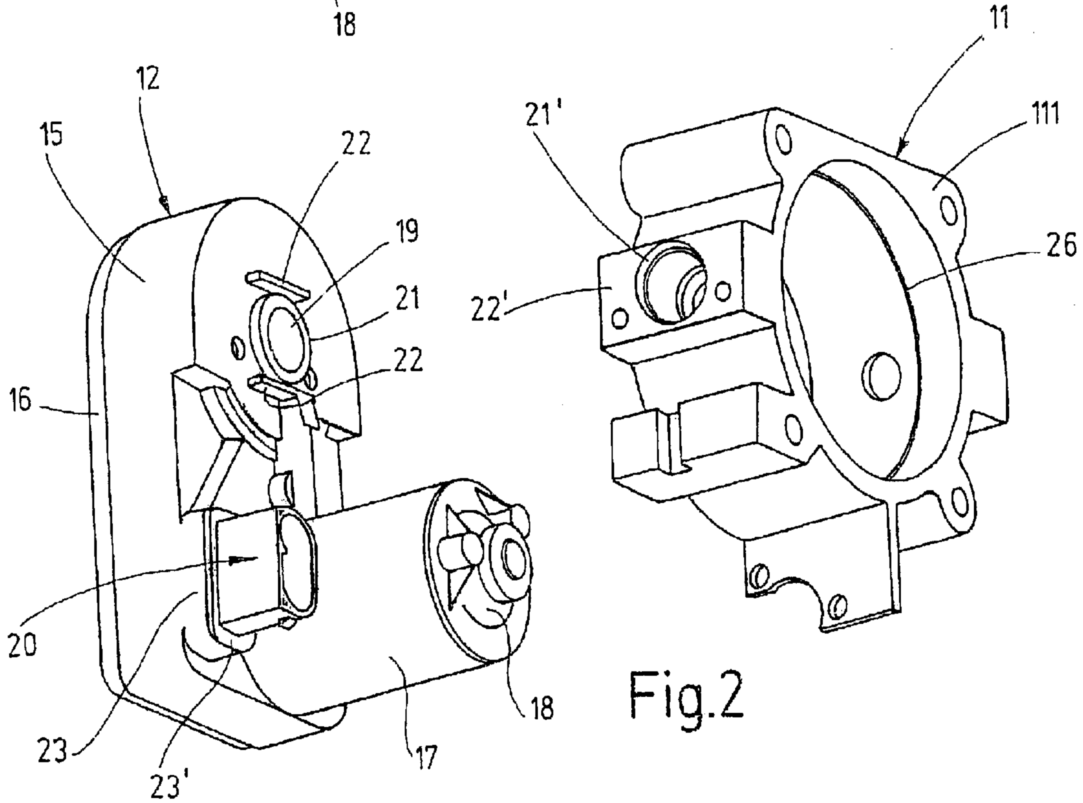
FIG. 2, an exploded perspective view of the throttle valve actuator unit in FIG. 1, with a throttle valve neck removed from a housing module.

In the throttle valve actuator unit for an internal combustion engine shown in its assembled form in FIG. 1 and in FIG. 2 in individual parts, in each case in perspective, a throttle valve neck 11 is placed on a housing module 12 and solidly joined to it. A throttle valve shaft 14 that carries a throttle valve 13 is rotatably supported in the throttle valve neck 11. The housing module 12, preferably made from plastic, which encloses a drive chamber for receiving an electric drive mechanism of the throttle valve shaft, has a shell-shaped base body 15 and a cap 16 that closes the base body 15, as well as having a hollow-cylindrical receiving compartment 17, which is formed onto and integral with the base body 15 and projects at a right angle from the base body 15. The electric motor of the drive mechanism is received in the receiving compartment 17; one end of the power takeoff shaft of the motor is supported rotatably in a bearing plate 18, which closes off the end, remote from the base body 15, of the receiving compartment 17. A through opening 19 is formed in the base body 15 at a distance from the receiving compartment 17, and its normal or opening axis is oriented parallel to the longitudinal axis of the receiving compartment 17. When the throttle valve neck 11, provided with the throttle valve 13 and throttle valve shaft 14, is attached to the housing module 12, one end of the throttle valve shaft 14 passes through the through opening 19 into an inner chamber enclosed by the base body 15. Inside this inner chamber, the throttle valve shaft 14 is coupled mechanically, via a reducing gear, to the motor power takeoff shaft of the electric motor, which shaft also protrudes into the inner chamber; this is described in detail and shown in DE 195 25 510 A1. As in the aforementioned reference, there is a sensor, not shown here, in the inner chamber for reporting the pivoted position of the throttle valve 13, but the sensor is disposed on the base body 15 (rather than on the cap 16). Both the terminals of the electric motor and the terminals of the sensor are extended to a plug 20, by way of which a plug connection with a control unit can be made. The plug 20, like the throttle valve neck 11, is embodied such that it can be attached to the housing module 12, specifically to the base body 15, and can be fixed thereon. For positionally correct attachment of the throttle valve neck 11 and the plug 20 to the housing module 12, seats are formed on the base body 15, on the one hand, and on the throttle valve neck 11 and the plug 20 on the other; on being joined, these seats mesh with one another and assure the precise-tolerance position of the throttle valve neck 11 and plug 20 on the housing module 12. Pairs of seats between the base body 15 and the throttle valve neck 11 are marked in FIG. 2 by reference numerals 21, 21' and 22, 22'. One pair of seats between the base body 15 and the plug 20 is marked 23, 23'.

For the sake of offering a wide variety of versions of the throttle valve actuator unit that are adapted to client demands yet have low production costs, the throttle valve neck 11 and the plug 20 are—as described—separate parts, readied for connection to the housing module 12 but manufactured detached from the housing module 12, and are accordingly easy to adapt to customer-specific requirements. Such requirements include different diameters of the throttle valve neck 11 and different dimensions of the securing flange 111 embodied on the throttle valve 11. In the plug 20, the number and arrangement of the pins also vary, depending on customer demands. These separately produced parts are then attached to the housing module 12 positionally accurately by means of the seats 21–23 in the desired embodiments and fixed thereon, for instance by clamping pins.

Figure 3:
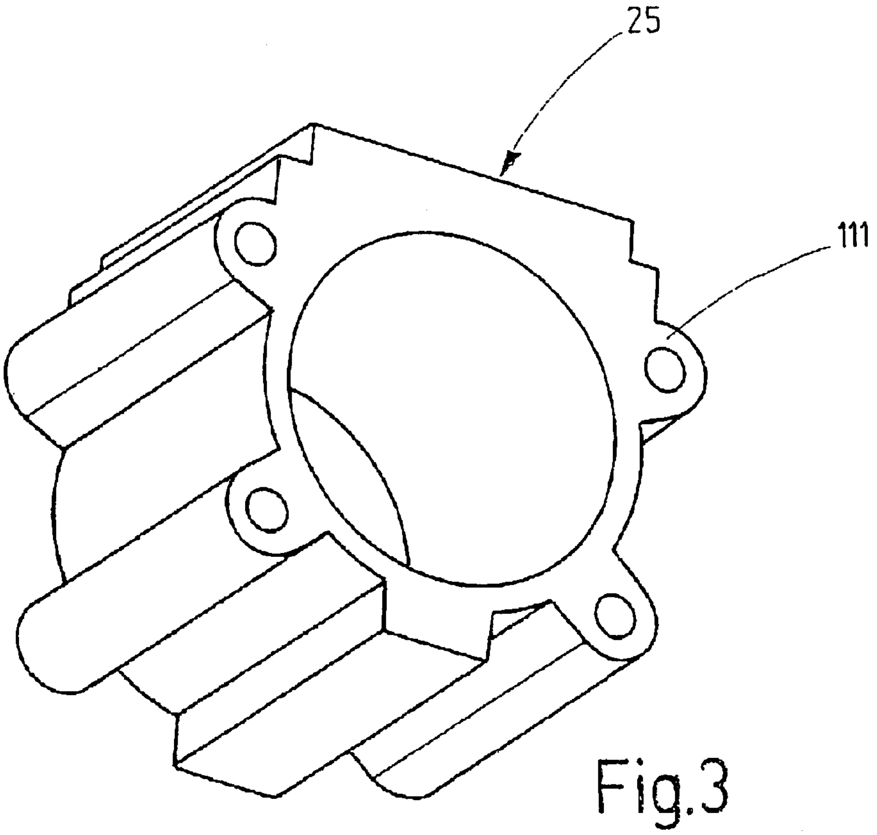
FIG. 3, a perspective view of a blank, cut to the appropriate length from an extruded profile, for a modified throttle valve neck.
Figure 4:
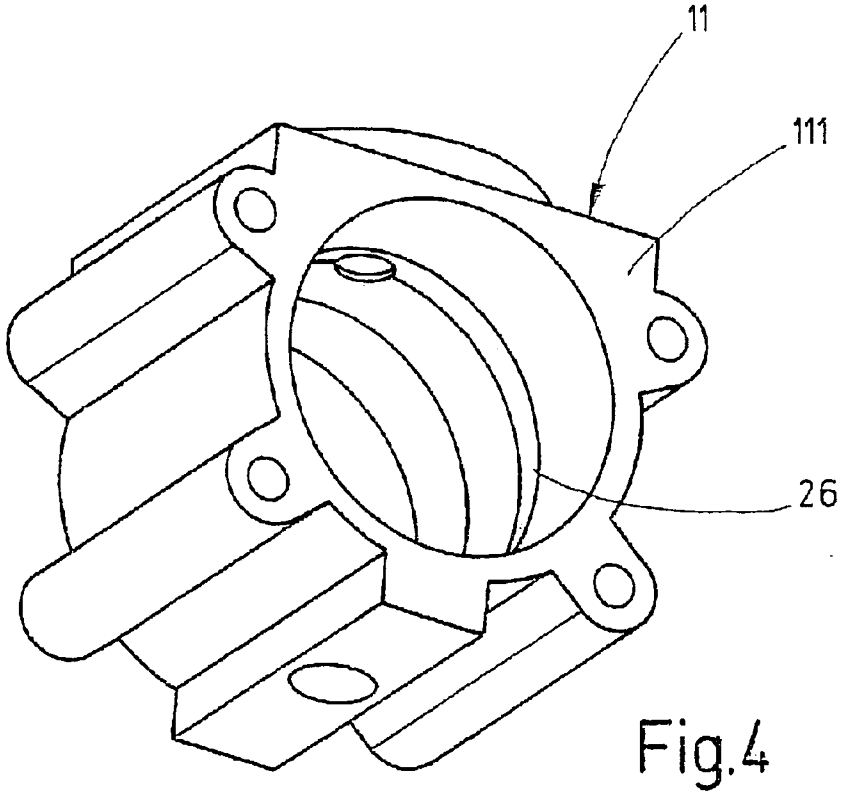
FIG. 4, a perspective view of the throttle valve neck after machining of the blank of FIG. 3.

For the sake of further cost advantages in production of the throttle valve actuator unit, the throttle valve neck 11 is produced as an extruded profile. The extruded profile is made as an endless profile, and from the extended profile blanks with a length required for the throttle valve neck 11 are then cut. One such blank 25, cut to the proper length from an extruded profile, is shown in FIG. 3. This blank 25, because of the extruded profile, already has essentially the desired inside diameter of the throttle valve neck 11 and the dimensions of the securing flange 111. This blank 25 is then put into the desired final form of the throttle valve neck 11, as shown in FIG. 4, by machining that removes material. The throttle valve neck 11 shown in FIGS. 1 and 2 is manufactured in the same way.

Once the throttle valve neck 11 with the throttle valve 13 and throttle valve shaft 14 is completed, the throttle valve neck 11 is further provided with a connecting scoop 24 onto which a connection hose can be slipped. On its free end protruding from the throttle valve neck 11, the connecting scoop 24 has a hose connection geometry 241 that must in turn be designed differently for various customers. To meet customer demands while lowering production costs, the connecting scoop 24 is made as a separate pipe segment of plastic or metal and then inserted into the throttle valve neck 11. Once again, the separate production of the connecting scoop 24 makes it possible to adapt the hose connection geometry economically to customer demands. Securing the pipe segment in the throttle valve neck 11 is done for instance by press-fitting or gluing. The position of the pipe segment in the throttle valve neck 11 can be specified by an annular stop shoulder 26 (FIGS. 2 and 4) formed onto the inner wall of the stub.

The invention is not limited to the exemplary embodiment described above. For instance, the throttle valve neck 11 and connecting scoop 24 may also be integral, for instance by producing the connecting scoop 24, after the blank 25 has been suitably cut to length from the extruded profile, by means of material-removing machining. Alternatively, if the advantages of the extruded profile production are dispensed with, a cast body of plastic or metal that includes both a throttle valve neck 11 and a connecting scoop 24 can be produced by casting technology; it may also require post-machining afterward.

The foregoing relates to preferred exemplary embodiments of the invention, it being understood that other variants and embodiments thereof are possible within the spirit and scope of the invention, the latter being defined by the appended claims.

What is claimed is:

1. A throttle valve actuator unit, having a first module comprising a throttle valve neck (11), a throttle valve shaft (14) carrying a throttle valve (13) rotatably supported, on the valve shaft, and a second module, also called a housing module, comprising a drive chamber for receiving an electric drive mechanism for the throttle valve shaft (14) and for receiving an electric connection plug (20) for a plug connection for a control unit, the drive chamber being enclosed by the housing module (12), to which the throttle valve neck (11) is attached as a separate part and secured, so that only one of the two modules needs to be adapted to meet varied customer specification, without any change in the other module.

2. The throttle valve actuator unit of claim 1, wherein the connection plug (20) is attached as a separate part to the housing module (12) and secured.

3. The throttle valve actuator unit of claim 1, wherein seats (21, 21', 22, 22', 23, 23') are formed on the housing module (12) on the one hand, and on the other hand on the throttle valve neck (11) and the connection plug (20), respectively, the seats being insertable into one another.

4. The throttle valve actuator unit of claim 2, wherein seats (21, 21', 22, 22', 23, 23') are formed on the housing module (12) on the one hand, and on the other hand on the throttle valve neck (11) and the connection plug (20), respectively, the seats being insertable into one another.

5. The throttle valve actuator unit of claim 1, wherein the housing module (12) has a shell-shaped base body (15) and a cap (16) that closes the base body, and the throttle valve neck (11) and connection plug (20) are each attached to the base body (15).

6. The throttle valve actuator unit of the claim 2, wherein housing module (12) has a shell-shaped base body (15) and a cap (16) that closes the base body, and the throttle valve neck (11) and connection plug (20) are each attached to the base body (15).

7. The throttle valve actuator unit of claim 3, wherein the housing module (12) has a shell-shaped base body (15) and a cap (16) that closes the base body, and the throttle valve neck (11) and connection plug (20) are each attached to the base body (15).

8. The throttle valve actuator unit of claim 5, further comprising a preferably hollow-cylindrical receiving compartment (17), embodied on the base body for receiving an electric control motor, the receiving compartment being is integral with the base body (15) and preferably protrudes from the base body (15) at a right angle.

9. The throttle valve actuator unit of claim 8, further comprising a through opening (19) formed in the base body

(15), the normal of the through opening being oriented parallel to the longitudinal axis of the receiving compartment (17).

10. The throttle valve actuator unit of claim 1, wherein the housing module (12) is made from plastic.

11. The throttle valve actuator unit of claim 3, wherein housing module (12) is made from plastic.

12. The throttle valve actuator unit of claim 5, wherein the housing module (12) is made from plastic.

13. The throttle valve actuator unit of claim 1, wherein the throttle valve neck (11) is produced as an extruded profile.

14. The throttle valve actuator unit of claim 10, wherein the throttle valve neck (11) is produced as an extruded profile.

15. The throttle valve actuator unit of claim 1, further comprising a connecting scoop (24) with a hose connection geometry (241) inserted as a separate pipe segment into the throttle valve neck (11).

16. The throttle valve actuator unit of claim 13, further comprising a connecting scoop (24) with a hose connection geometry (241) inserted as a separate pipe segment into the throttle valve neck (11).

17. The throttle valve actuator unit of the claim 15, wherein pipe segment is made from plastic or metal and is secured to the throttle valve neck (11), in particular being press-fitted or glued into it or secured to it by means of welding, soldering, screwing or the like.

* * * * *